United States Patent
Fathimulla et al.

(10) Patent No.: US 6,772,503 B1
(45) Date of Patent: Aug. 10, 2004

(54) ROTOR ASSEMBLY HAVING BONDED LAMINATION STACK

(75) Inventors: Ayub Fathimulla, Ellicott City, MD (US); M. N. Menon, Tempe, AZ (US); Walter Lee Meacham, Phoenix, AZ (US)

(73) Assignee: Honeywell International Inc., Morristown, NY (US)

( * ) Notice: Subject to any disclaimer, the term of this patent is extended or adjusted under 35 U.S.C. 154(b) by 90 days.

(21) Appl. No.: 09/643,970

(22) Filed: Aug. 22, 2000

(51) Int. Cl.[7] ............................................. H02K 15/10
(52) U.S. Cl. .......................... 29/598; 29/609; 29/596; 310/51; 310/214; 310/216
(58) Field of Search .................... 29/596, 597, 598, 29/609, 732, 738; 310/51, 254, 261, 154, 156, 214, 216, 42

(56) References Cited

U.S. PATENT DOCUMENTS

| | | | |
|---|---|---|---|
| 3,652,355 A | * 3/1972 | Herrick ...................... 156/151 |
| 4,025,379 A | * 5/1977 | Whetstone ................... 148/101 |
| 4,103,195 A | * 7/1978 | Torossian et al. ............ 310/259 |
| 4,585,967 A | * 4/1986 | Mayer et al. .................. 29/598 |
| 4,868,970 A | * 9/1989 | Schultz et al. ................ 29/596 |
| 5,875,540 A | * 3/1999 | Sargeant et al. .............. 29/596 |
| 5,893,205 A | * 4/1999 | McClelland .................. 29/598 |
| 6,047,460 A | * 4/2000 | Nagate et al. ............... 205/137 |
| 6,301,773 B1 | * 10/2001 | Chemburkar ................ 29/596 |
| 2001/0001895 A1 | * 5/2001 | Setiabudi et al. ............. 29/609 |

FOREIGN PATENT DOCUMENTS

WO    WO009730504 A1 * 8/1997 ............ H02K/1/04

* cited by examiner

Primary Examiner—Irene Cuda Rosenbaum
Assistant Examiner—Stephen Kenny
(74) Attorney, Agent, or Firm—Kris T. Fredrick

(57) ABSTRACT

A rotor assembly includes a stack of laminations that are bonded together by a dielectric bonding agent. The laminations and the dielectric bonding agent have matching coefficients of thermal expansion.

17 Claims, 3 Drawing Sheets

ROTOR ASSEMBLY HAVING BONDED LAMINATION STACK

BACKGROUND OF THE INVENTION

The invention relates generally to electrical machines. More particularly, the invention relates to a laminated rotor assembly for an electrical machine.

A typical design approach for a laminated rotor assembly includes shrink fitting a stack of laminations onto a shaft. The resulting shrink fit is used to transmit toque from the shaft to the laminations. Only the shaft provides stiffness and support for the laminations. Due to material limitations and shaft stiffness requirements, however, this approach results in a rotor assembly having a low tip speed, low relative stiffness and, consequently, poor dynamic performance.

Dynamic performance can be improved by increasing the stiffness of the lamination stack. Increasing the stiffness decreases the amount of deflection during operation at high rotational speeds and/or high operating temperatures.

Stiffness can be increased by clamping the lamination stack with a central tieshaft. Higher clamping loads result in higher stiffness. However, the higher clamping loads also decrease efficiency of the electrical machine. Magnetic insulation layers are not well maintained under high clamping loads, and core losses are increased. Moreover, the tieshaft interferes with the cooling of the lamination stack.

SUMMARY OF THE INVENTION

A rotor assembly of an electrical machine comprises a stack of laminations and a dielectric bonding agent. The laminations are bonded together by the dielectric bonding agent. The laminations and the dielectric bonding agent have matching coefficients of thermal expansion.

DETAILED DESCRIPTION OF THE INVENTION

Figure 1:
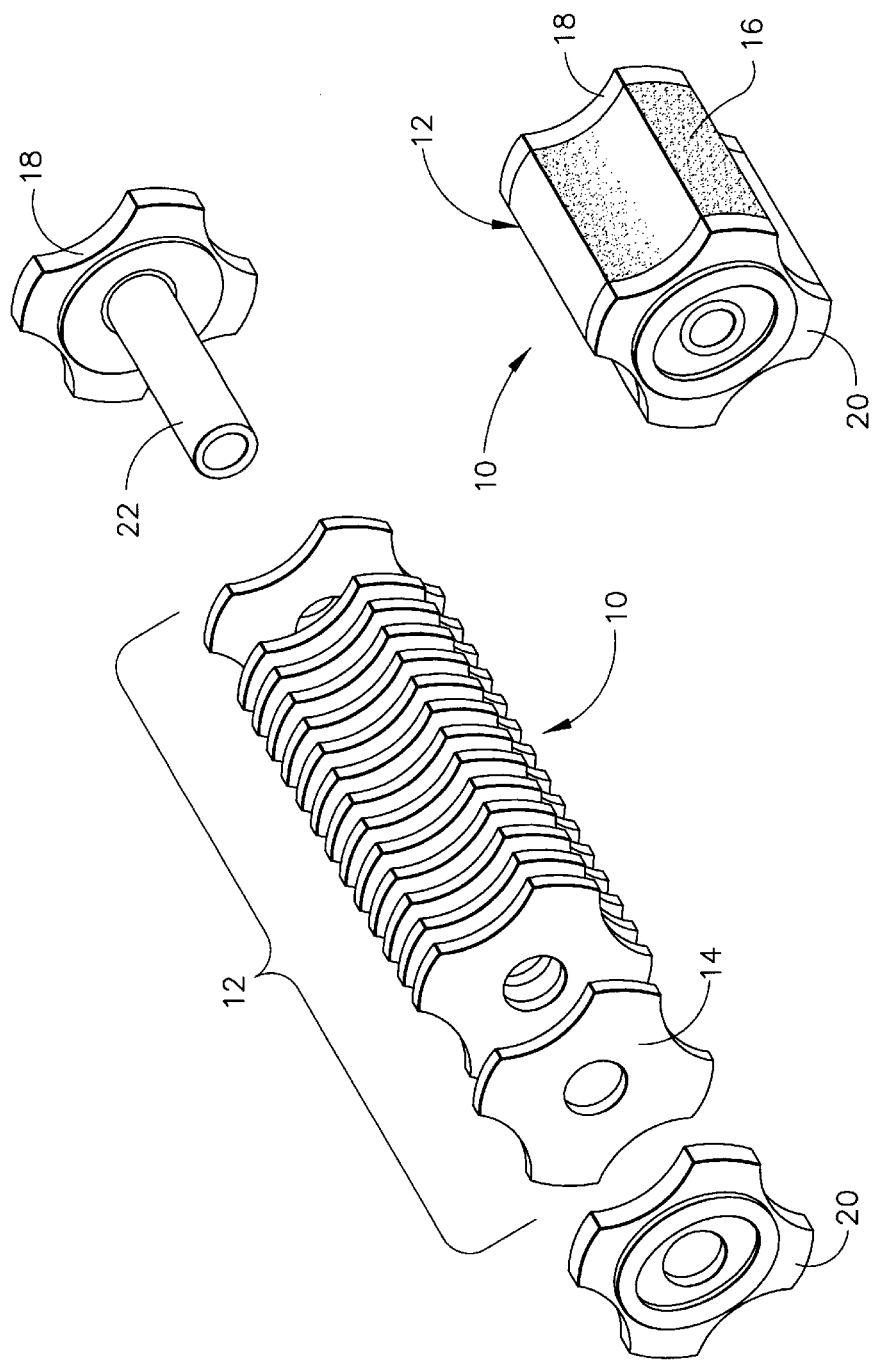
FIG. 1a is an exploded perspective view of a rotor assembly according to the present invention.
FIG. 1b is a perspective view of the rotor assembly after bonding.

FIGS. 1a and 1b show a rotor assembly 10 including a stack 12 of laminations 14. The laminations 14 can be made of a soft magnetic material such as ironcobalt or silicon steel. The laminations 14 shown in FIGS. 1a and 1b are configured for a switched reluctance machine. However, the laminations 14 could be configured for other types of electrical machines, such as inductance machines and wound rotor machines. The laminations 14 are bonded together by a dielectric bonding agent 16.

The dielectric bonding agent 16 is made of a non-magnetic insulator material. The laminations 14 and the dielectric bonding agent 16 have matching coefficients of thermal expansion. Dielectric bonding agents 16 can include, but are not limited to, spin-on-glass (doped or undoped), probomide, polyimide, organic-based ceramic compounds and sol-gels. Dielectric bonding agents 16 can also include organic-based metallic-oxide compounds such a titanium oxide ($TiO_2$), aluminum oxide ($Al_2O_3$) and silicon nitride ($Si_3N_4$). The dielectric bonding agent 16 can even be a material having a low dielectric constant (K) such as "Teflon" (K=~2.3). Selection of the dielectric bonding agent 16 depends upon factors such as ability to bond to the surface of the laminations 14, the coefficient of thermal expansion of the lamination material, and operating temperature of the rotor assembly 10. The dielectric bonding agents 16 listed above can be used for laminations made of iron-cobalt and silicon steel at operating temperatures of up to 1000° F.

Thickness and surface finish of the layers of bonding agent 16 between the laminations 14 are dependent upon the application for which the rotor assembly 10 is intended. Thick layers having coarse finishes generally adhere better to the laminations 14 than thin, polished layers. Moreover, thicker layers offer better magnetic insulation. However, rotor assemblies having thin, polished layers have better stacking factors than rotor assemblies having thick, coarse layers. The rotor assemblies having better stacking factors can also have larger diameters and, therefore, larger tip speeds. Resulting is a tradeoff: bonding strength and magnetic insulation versus stacking factor and size of the rotor assembly.

The rotor assembly 10 further includes first and second end caps 18 and 20 that are bonded to opposite ends of the lamination stack 12 by the dielectric bonding agent 16. The end caps 18 and 20 are made of a non-magnetic material. A shaft 22 extends though a central bore of the lamination stack 12. The lamination stack 12 is secured to the shaft 22 by an interference fit. In the alternative, the shaft 22 can be bonded to the lamination stack 12 by the bonding agent 16 while the laminations 14 are being bonded together.

Figure 2:
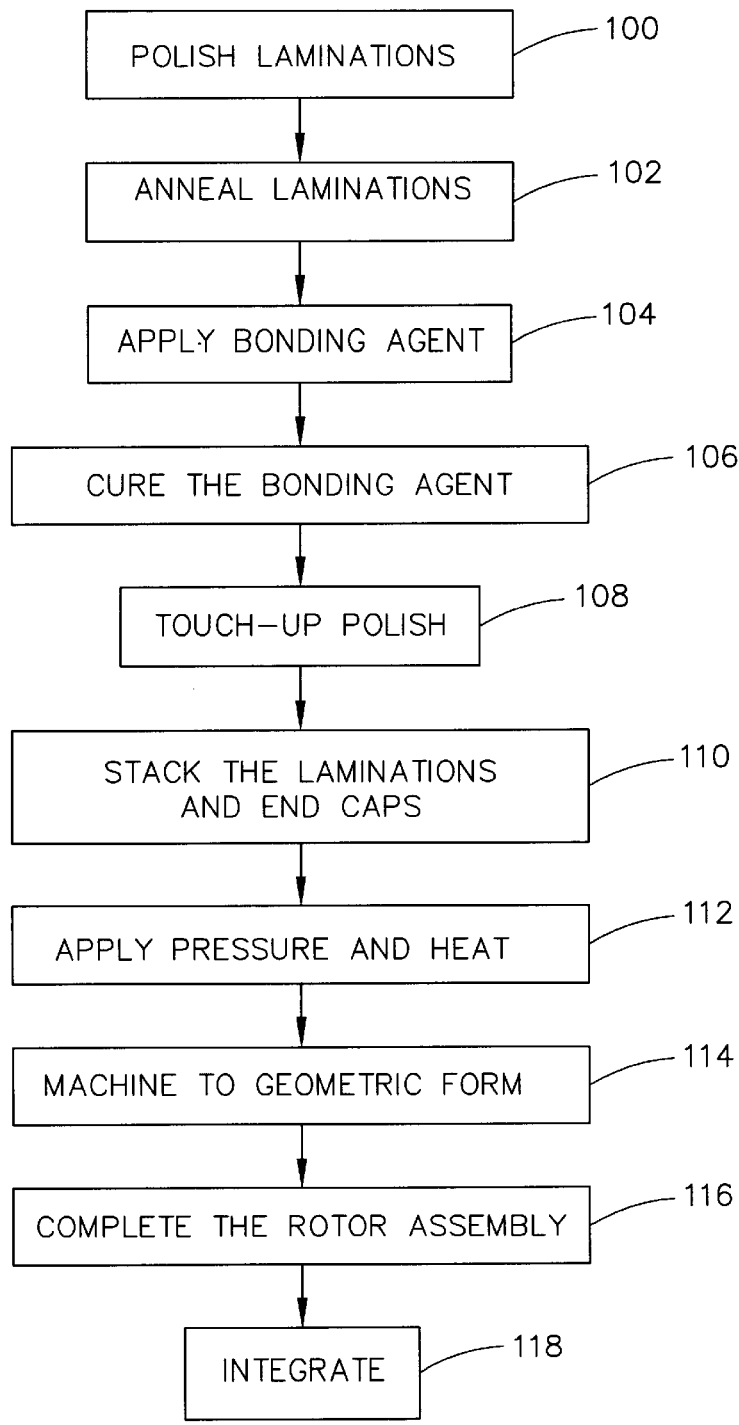
FIG. 2 is a flowchart of a method of fabricating the rotor assembly.

FIG. 2 shows the steps for fabricating the rotor assembly 10. The laminations are polished to remove rough surfaces (step 100). After the surfaces are polished, the laminations 14 are annealed (step 102). Annealing improves the mechanical and magnetic properties of the laminations 14. Next, the bonding agent 16 is applied (step 104). The entire surfaces of the laminations 14 are covered with the dielectric bonding agent 16, and end cap surfaces that come into contact with the lamination stack 12 are also covered with the dielectric bonding agent 16. Layers of the dielectric bonding agent 16 can be applied to the laminations 14 and end caps 16 and 18 by a process such as spin-coating, spraying, rolling and/or dipping.

After the bonding agent 16 is applied, it is cured (step 106). Curing drives out organic solvents in the bonding agent 16.

If necessary, the layers of the dielectric bonding agent 16 are polished (step 108). Applying the bonding agent 16 by a process such as spin coating might cause a buildup around the edges of the laminations 14. Polishing would remove the buildup. A process such as dip coating, however, might not cause a buildup and, therefore, might not have to be followed by polishing.

Next, the laminations 14 and the end caps 16 and 18 are stacked (step 110). Bringing the laminations 14 into contact causes a moderately strong bond to be formed between the laminations 14.

Bond strength is increased greatly by applying a pressure load to the laminations 14 during a predefined thermal cycle (step 112). During the thermal cycle, temperature is raised from room temperature to a curing temperature. After the bonding agent has been allowed to cure, the temperature is lowered and the pressure load is removed. Here too, a tradeoff is involved. Lower temperatures over longer curing periods generally result in higher strength and better insulation properties. Thus, the tradeoff is manufacturing speed versus mechanical and insulation properties. Still, higher temperatures over shorter curing periods could still provide: a lamination stack 12 having adequate strength and magnetic insulation.

By way of example, laminations 14 made of an iron-cobalt alloy are bonded with probomide. The probomide is spin-coated onto the laminations 14 to a thickness of approximately five microns, the laminations 14 are stacked, and a pressure load of six tons on a six inch plate is applied to the stack 12 for two to twenty four hours at a temperature between 200° C. and 300° C.

The lamination stack 12 is then machined to geometric form (step 114). Machining after stacking and bonding is far simpler than the conventional process of precutting geometric figures and then stacking.

The rotor assembly 10 is then completed (step 116). If the shaft 22 has not already been bonded to the lamination stack 12, the bonded lamination stack 12 is secured to the shaft 22 by an interference fit. The rotor assembly 10 can be journalled by bearings, balanced by adding or removing balance material, and checked and corrected for runout. Detailing the rotor assembly 10 can be done more easily and less expensively after assembly than detailing a conventional rotor during various phases of assembly. Detailing after assembly allows for better quality control of the rotor assembly 10.

Piloting features can be added to the rotor assembly 10. The end caps 18 and 20 can be provided with piloting features that engage piloting features of other components of a turbomachine. The piloting features can include curvex, axial face and radial diameter, or other such features.

Resulting is a component that can be integrated into an electrical machine or the rotating group of a turbomachine (step 118). The rotor assembly 10 can be used as a starter/generator capable of high-speed and high-temperature operation in a turbomachine such as an Auxiliary Power Unit (APU) or an Integrated Power Unit (IPU). However, usage of the rotor assembly 10 is not limited to such turbomachines. The rotor assembly 10 can also be used in small, low-speed, low-temperature motors for products such as household appliances.

Figure 3:
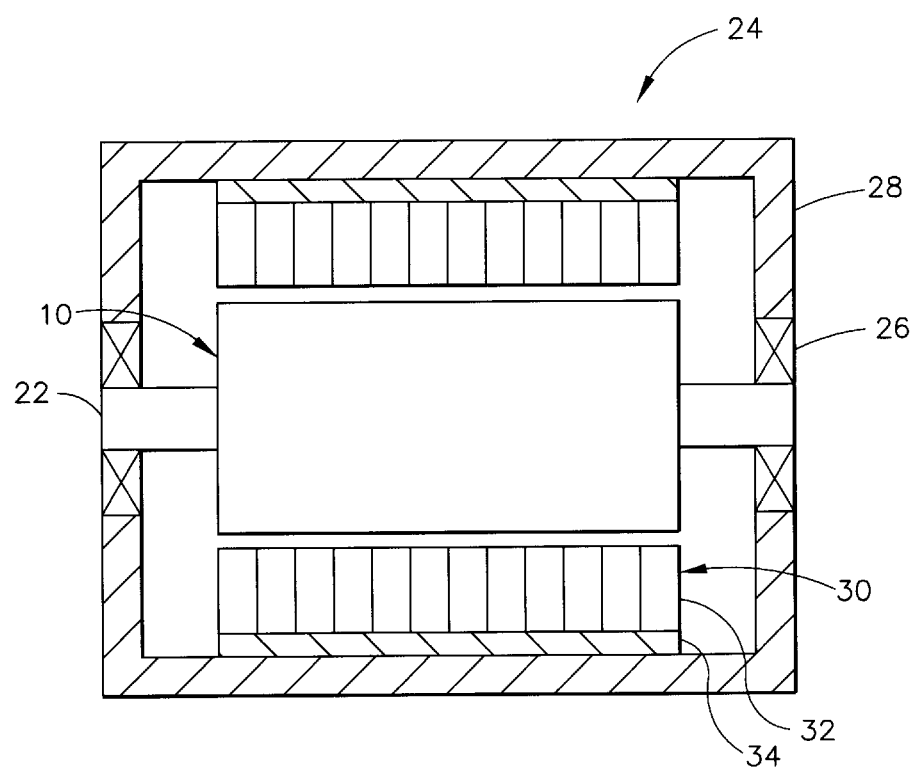
FIG. 3 is a schematic diagram of an electrical machine including the rotor assembly.

FIG. 3 shows a rotor assembly 10 that is integrated into an electrical machine 24. The rotor assembly 10 is supported by bearings 26 within a housing 28. A stator assembly 30 is mounted to the housing 28. The stator assembly 30 includes a stack 32 of laminations surrounding the rotor assembly 10 and a retainer sleeve 34 surrounding the lamination stack 32. The retainer sleeve 34 and the laminations of the stack 32 can be bonded together as described above.

Figure 4:
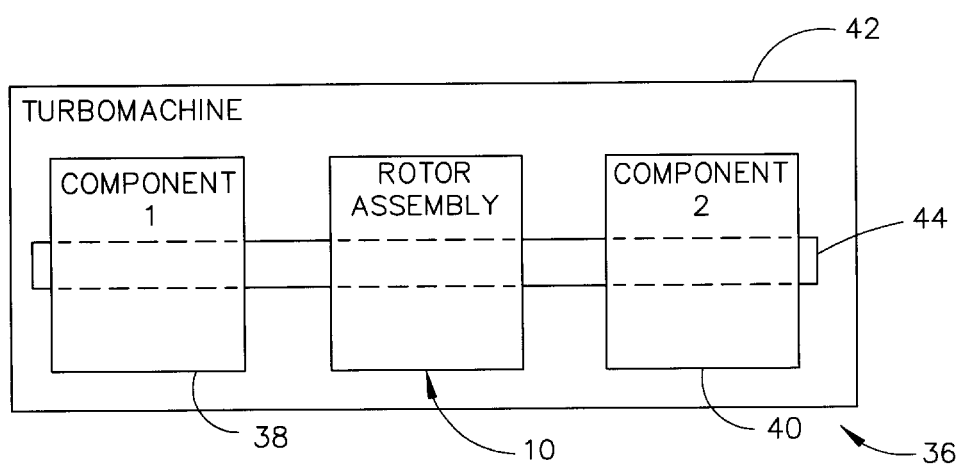
FIG. 4 is a block diagram of a turbomachine including the rotor assembly.

FIG. 4 shows a rotor assembly 10 that is integrated into the rotating group of a turbomachine 36. The rotating group also includes a first component 38 such as a turbine wheel assembly, a second component 40 such as a compressor wheel assembly, and a housing 42. The rotor assembly 10 and the first and second components 38 and 40 are stacked together, with piloting features on the end caps 18 and 20 of the rotor assembly 10 mating with piloting features on the first and second components 38 and 40. The rotor assembly 10 and the first and second components 38 and 40 are secured together by a group tieshaft 44.

Thus disclosed is a laminated rotor assembly 10 that achieves high stiffness by bonding instead of clamping.

Bonding instead of clamping reduces core and insulation losses. Bonding instead of clamping also eliminates the tieshaft. Eliminating the tieshaft increases cooling efficiency and reduces overall length of the electrical machine.

Bonding also eliminates the need for a pilot shaft. This, in turn, further increases cooling efficiency, since a cooling fluid can be brought into direct contact with the laminations 14.

The bonded laminations 14 also offer superior mechanical and dynamic characteristics over unbonded, unclamped laminations. Bonded laminations 14 have higher stiffness, which reduces rotor deflections. Bonded laminations 14 are less likely to shift and produce vibrations that could damage the electrical machine. Additionally, bonding allows some of the poles of the laminations to be offset. Offsetting some of the poles allows to cooling flow to be optimized along the poles and windage losses to be minimized.

Bonding also improves the manufacturability and reliability of the rotor assembly 10. As with glue, the dielectric bonding agent 16 makes it easier to assemble loose laminations. Unlike glue, the dielectric bonding agent 16 contributes to the strength and stiffness of the laminations 14. Additionally, the dielectric bonding agent 16 does not have the inherent temperature limitations of glue. Whereas the glue limits a rotor assembly to low temperature operation, the dielectric bonding agent 16 allows the rotor assembly 10 to run at high operating temperatures.

We claim:

1. A method of fabricating a rotor assembly, comprising:
   applying a dielectric bonding agent to surfaces of a plurality of laminations; wherein the dielectric bonding agent and the laminations have substantially matching coefficients of thermal expansion;
   stacking the plurality of laminations; and
   applying a thermal cycle to said stack of laminations of sufficient temperature to cure said dielectric bonding agent such that the laminations maintain a bond in operating temperatures up to 1000 degrees Fahrenheit.

2. The method of claim 1, wherein the dielectric bonding agent is selected from a group consisting of metallic oxides, spin-on-glass and silicon nitride.

3. The method of claim 1, further comprising of applying a pressure load to the stacked laminations during the thermal cycle.

4. The method of claim 2, further comprising applying the dielectric bonding agent to end caps, stacking the end caps along with the laminations, and applying the pressure load to the end caps during the thermal cycle.

5. The method of claim 4, further comprising machining geometric forms into the lamination stack after the laminations have been bonded.

6. A method of fabricating a rotor assembly, comprising:
   annealing a plurality of laminations;
   applying a dielectric bonding agent to surfaces of each lamination of the plurality of laminations;
   applying a dielectric bonding agent to the surfaces of end caps; wherein the dielectric bonding agent and the laminations have substantially matching coefficients of thermal expansion;
   stacking the plurality of laminations into a stack;
   placing one end cap at each end of the stack;
   applying pressure on both end caps to compress the stack;
   heating the stack and the end caps to a temperature sufficient to cure the dielectric bonding agent; such that the cured bonding agent is able to maintain the bond of the stack and of the end caps at operating temperatures up to 1000 degrees F.; and removing the heating and pressure from the end caps and the stack.

7. The method of claim 6, wherein the dielectric bonding agent is selected from a group consisting of metallic oxides, spin-on-glass and silicon nitride.

8. The method of claim 6, wherein each lamination of the rotor assembly is one piece of metal.

9. The method of claim 8, wherein the surface of each end cap facing the stack is essentially flat.

10. The method of claim 8, wherein the one piece of metal is a soft magnetic material.

11. The method of claim 10, further comprising polishing the surfaces of each lamination prior to applying the dielectric bonding agent to the surfaces of each lamination.

12. The method of claim 11, further comprising annealing each lamination prior to applying the dielectric bonding agent to the surfaces of each lamination.

13. A method of fabricating a rotor assembly, comprising:

annealing each lamination of a plurality of laminations;

applying a dielectric bonding agent to the surfaces of each lamination of the plurality of laminations; wherein the dielectric bonding agent and the laminations have approximately equal coefficients of thermal expansion;

stacking the laminations; and applying a thermal cycle to the stacked laminations to cure the dielectric bonding agent;

wherein the temperature at which said thermal cycle is performed provides a cured bond that can endure operating temperatures up to 1000 degrees Fahrenheit.

14. The method of claim 13, wherein the dielectric bonding agent is selected from a group consisting of metallic oxides, spin-on-glass and silicon nitride.

15. The method of claims 14, further comprising applying a pressure load to the stacked laminations during the thermal cycle.

16. The method of claim 15, further comprising:

applying the dielectric bonding agent to end caps;

stacking the end caps at each end of the stacked laminations; and additionally applying the pressure load to the end caps during the thermal cycle.

17. The method of claim 16, further comprising removing excess bonding agent from the stacked laminations.

* * * * *